US010826603B1

(12) United States Patent
Kowalevicz et al.

(10) Patent No.: US 10,826,603 B1
(45) Date of Patent: Nov. 3, 2020

(54) METHOD FOR CAVITY TUNING USING REFLECTED SIGNAL MEASUREMENT

(71) Applicant: RAYTHEON COMPANY, Waltham, MA (US)

(72) Inventors: Andrew Kowalevicz, Arlington, VA (US); Gary M. Graceffo, Burke, VA (US); Benjamin P. Dolgin, Alexandria, VA (US)

(73) Assignee: RAYTHEON COMPANY, Waltham, MA (US)

(*) Notice: Subject to any disclaimer, the term of this patent is extended or adjusted under 35 U.S.C. 154(b) by 0 days.

(21) Appl. No.: 16/698,514

(22) Filed: Nov. 27, 2019

(51) Int. Cl.
*H04B 10/67* (2013.01)
*H04B 10/071* (2013.01)
*H04B 10/079* (2013.01)
*H04B 10/61* (2013.01)
*H04B 10/54* (2013.01)

(52) U.S. Cl.
CPC ..... *H04B 10/071* (2013.01); *H04B 10/07955* (2013.01); *H04B 10/54* (2013.01); *H04B 10/614* (2013.01)

(58) Field of Classification Search
CPC ..................................................... H04B 10/67
See application file for complete search history.

(56) References Cited

U.S. PATENT DOCUMENTS

| | | |
|---|---|---|
| 6,243,200 B1 | 6/2001 | Zhou et al. |
| 7,738,798 B2 | 6/2010 | Mayer et al. |
| 8,554,085 B1 | 10/2013 | Yap et al. |
| 8,908,187 B2 | 12/2014 | Strandjord et al. |
| 9,018,575 B2 | 4/2015 | Kowalevicz et al. |
| 9,115,994 B2 | 8/2015 | Strandjord et al. |
| 9,165,963 B2 | 10/2015 | Kowalevicz et al. |
| 9,171,219 B2 | 10/2015 | Kowalevicz |
| 9,400,414 B2 | 7/2016 | Kowalevicz |
| 9,503,660 B2 | 11/2016 | Kowalevicz et al. |
| 9,535,245 B1 | 1/2017 | Kowalevicz |
| 9,684,127 B2 | 6/2017 | Qi et al. |
| 9,823,075 B2 | 11/2017 | Yao |
| 9,876,580 B2 | 1/2018 | Yuan et al. |
| 9,887,779 B2 | 2/2018 | Kowalevicz |
| 9,905,999 B2 | 2/2018 | Li et al. |
| 9,973,281 B2 | 5/2018 | Kowalevicz et al. |
| 10,164,765 B2 | 12/2018 | Dolgin et al. |

(Continued)

FOREIGN PATENT DOCUMENTS

EP    1686707 A2    8/2006

OTHER PUBLICATIONS

Merimaa et al. "Portable laser frequency standard at 633 nm with compact external-cavity diode laser", Metrologia (2001) vol. 38, pp. 311-318.

(Continued)

*Primary Examiner* — Shi K Li
(74) *Attorney, Agent, or Firm* — Lando & Anastasi, LLP (57) ABSTRACT

Optical receivers and methods for tuning an operating point of an optical resonator, such as a Fabry-Perot etalon are disclosed. A free-space optical signal is received at an optical receiver and directed towards at least one beam splitter. After passing through the beam splitter, the optical signal is reflected off a surface of the optical resonator. The reflected signal is detected and utilized to tune the operating point of the optical resonator.

22 Claims, 4 Drawing Sheets

(56) References Cited

U.S. PATENT DOCUMENTS

| | | |
|---|---|---|
| 10,177,856 B2 | 1/2019 | Kowalevicz et al. |
| 10,205,526 B2 | 2/2019 | Kowalevicz |
| 10,225,020 B2 | 3/2019 | Dolgin et al. |
| 10,243,670 B2 | 3/2019 | Kowalevicz et al. |
| 10,243,673 B2 | 3/2019 | Dolgin et al. |
| 10,250,292 B2 | 4/2019 | Graceffo et al. |
| 10,256,917 B2 | 4/2019 | Dolgin et al. |
| 10,305,602 B2 | 5/2019 | Dolgin et al. |
| 10,313,022 B2 | 6/2019 | Dolgin et al. |
| 10,415,971 B2 | 9/2019 | Krueger et al. |
| 2005/0225775 A1 | 10/2005 | Brunfeld et al. |
| 2005/0265728 A1 | 12/2005 | Yao |
| 2006/0013591 A1 | 1/2006 | Rohde |
| 2006/0023987 A1 | 2/2006 | Yao |
| 2008/0054160 A1 | 3/2008 | Yao |
| 2008/0079947 A1 | 4/2008 | Sanders et al. |
| 2008/0226300 A1* | 9/2008 | Mayer ............... H04B 10/677 398/158 |
| 2008/0310789 A1 | 12/2008 | Mihailov et al. |
| 2010/0073681 A1 | 3/2010 | Qiu et al. |
| 2012/0307253 A1 | 12/2012 | Sanders et al. |
| 2014/0369699 A1 | 12/2014 | Strandjord et al. |
| 2015/0236784 A1 | 8/2015 | Vahala et al. |
| 2015/0241278 A1 | 8/2015 | Holczer |
| 2016/0047655 A1 | 2/2016 | Qiu et al. |
| 2016/0116288 A1 | 4/2016 | Song et al. |
| 2016/0352515 A1 | 12/2016 | Bunandar et al. |
| 2017/0346564 A1 | 11/2017 | Wiswell |
| 2018/0054259 A1 | 2/2018 | Kowalevicz et al. |
| 2018/0091227 A1 | 3/2018 | Dolgin et al. |
| 2018/0091228 A1 | 3/2018 | Kowalevicz et al. |
| 2018/0091230 A1 | 3/2018 | Dolgin et al. |
| 2018/0091232 A1 | 3/2018 | Dolgin et al. |
| 2018/0102853 A1 | 4/2018 | Dolgin et al. |
| 2018/0145765 A1 | 5/2018 | Kowalevicz et al. |
| 2018/0167145 A1 | 6/2018 | Dolgin et al. |
| 2018/0234231 A1 | 8/2018 | Dolgin et al. |
| 2018/0270010 A1 | 9/2018 | Troeltzsch et al. |
| 2018/0313642 A1 | 11/2018 | Dolgin et al. |
| 2018/0367223 A1 | 12/2018 | Graceffo et al. |
| 2018/0372517 A1 | 12/2018 | Yao et al. |
| 2019/0007091 A1 | 1/2019 | Graceffo et al. |
| 2019/0017824 A1 | 1/2019 | Qiu et al. |
| 2019/0158208 A1 | 5/2019 | Dolgin et al. |
| 2019/0219396 A1 | 7/2019 | Krueger et al. |
| 2019/0305853 A1* | 10/2019 | Dolgin ............... H04B 10/614 |
| 2019/0305855 A1 | 10/2019 | Dolgin et al. |

OTHER PUBLICATIONS

Application Note: Variable Attenuator for Lasers, Technology and Applications Center, Newport Corporation (2006).

* cited by examiner

METHOD FOR CAVITY TUNING USING REFLECTED SIGNAL MEASUREMENT

BACKGROUND

Many optical communication systems manipulate light waves to carry information. For instance, often a light source (e.g., a laser source) is modulated to change various properties of emitted light, such as an amplitude, phase, or frequency of the light to convey information. An optical receiver may receive and demodulate the light waves to recover the information. There are many different types and formats of modulation that can be used, along with a wide range of possible carrier wavelengths. Generally, coherent optical receivers are required to provide the ability to accommodate complex modulation formats and high data rates. For free-space optical communications applications, additional adaptive optics are also sometimes required.

SUMMARY OF INVENTION

Aspects and embodiments are directed to optical receivers and methods of using the same.

In particular, aspects and embodiments are directed to the tuning of optical receivers that include one or more optical cavity resonators. In particular, aspects and embodiments are directed to tuning an operating point of an optical cavity resonator using a reflected signal from an optical cavity resonator. Additional aspects and embodiments are directed to tuning an operating point of the optical cavity resonator using a reflected signal from the optical cavity resonator and a transmitted signal from the optical cavity resonator. Additional aspects and embodiments are directed to tuning an operating point of the optical cavity resonator using a reflected signal from the optical cavity resonator and an auxiliary signal from the optical receiver.

According to one embodiment, an optical receiver comprises an optical resonator that is configured to receive an optical signal, that reflects a portion of the optical signal to produce a reflected signal, that is configured to accumulate a resonant optical energy based at least in part on the optical signal, and that is configured to produce an intensity-modulated transmitted signal, an intensity modulation of the intensity-modulated transmitted signal being representative of a modulation of an input optical signal, a first detector coupled to the optical resonator that is configured to detect the reflected signal and to provide a detected signal representative of a power level of the reflected signal, and a controller coupled to the optical resonator and to the first detector, the controller configured to provide a control signal to the optical resonator to tune an operating point of the optical resonator based on the power level of the reflected signal.

In one example, the optical receiver further comprises a second detector coupled to the optical resonator that is configured to detect the transmitted signal. In another example the further comprises a first beam splitter that is configured to split the input optical signal into a first portion directed towards the optical resonator and a second portion directed towards a third detector, wherein the controller is coupled to the third detector, and wherein the third detector is configured to detect a power level of the second portion of the input optical signal to provide an auxiliary signal to the controller. In one example, the optical resonator further comprises a first semi-reflective surface positioned to receive the optical signal and to provide the reflected signal back towards the first beam splitter.

The first beam splitter can be any ratio. In one example, the first beam splitter has an 80/20 ratio. In another example, the first beam splitter has a 95/5 ratio. In another example, the first beam splitter has a 50/50 ratio.

In one example, the optical resonator is a Fabry-Perot etalon.

In one example, the modulation of the input optical signal can be any of phase modulation, frequency modulation, intensity modulation, or a combination thereof.

In one example, the optical receiver further comprises a steering mechanism coupled to the third detector. In another example, the steering mechanism is a Fast Steering Mirror (FSM). In one example, the controller is configured to control the steering mechanism based on the auxiliary signal to adjust an angle of the input optical signal such that the second portion of the input optical signal is concentrated in a center of the third detector.

The third detector is a position sensitive detector. In one example, the third detector is a quad cell. In another example, the third detector is an octo-cell.

In one example, the optical resonator further comprises a second semi-reflective surface positioned facing the first semi-reflective surface, wherein the optical resonator is configured to accumulate the resonant optical signal energy inside the optical resonator between the first semi-reflective surface and the second semi-reflective surface to approach a steady-state output value of the transmitted signal, the intensity modulation of the transmitted signal including a series of deviations from the steady-state output value. In another example, the optical resonator further comprises a material interposed between the first semi-reflective surface and the second semi reflective surface. In one example, the material is an electro-optic material, and wherein the controller is configured to tune the operating point of the optical resonator by applying a voltage to the electro-optic material to alter the index of refraction of the material, causing an optical thickness of the optical resonator to change. In another example, the material is air, and wherein the controller is configured to tune the operating point of the optical resonator by altering a temperature of the air, causing an optical thickness of the optical resonator to change.

In one example, the material is a solid material. In one example, the solid material may be silicon. In one example, the optical resonator may be a solid silicon optical resonator. In one example, the optical thickness of the optical resonator is changed by altering the temperature of the solid silicon optical resonator. In one example, the temperature is changed using one or more heating elements. In one example, the one or more heating elements is a thermoelectric heater. In one example, the one or more heating elements is a Peltier heater.

In one example, the optical resonator is a piezo-tuned air-spaced etalon. In one example, the piezo-tuned air-spaced etalon may include the two semi-reflective surfaces that are moved relative to one another to alter a distance between the two semi-reflective surfaces, thereby changing or maintaining the operating point of the etalon. In one example, one or both of the semi-reflective surfaces may be moved by one or more piezo elements that change in length when a voltage is applied.

In one example, the first beam splitter is further configured to provide the reflected signal to the first detector.

In one example, the optical receiver further comprises a second beam splitter that is configured to receive the first portion of the input optical signal, and that is configured to transmit a third portion towards the optical resonator, and a polarization rotator configured to rotate a polarization axis of the third portion and provide a phase rotated signal to the optical resonator, and that further phase rotates the reflected signal to provide a further phase rotated reflected signal to the second beam splitter, wherein the second beam splitter provides the further phase rotated reflected signal to the first detector. In one example, the second beam splitter is a polarizing beam splitter (PBS). In one example, the polarization rotator is one of a Faraday rotator or a quarter-wave plate.

In one example, the third portion of the received signal is a p-polarized signal provided by the second beam splitter. In one example, the polarization rotator is a Faraday rotator configured to receive the p-polarized signal, to rotate the p-polarized signal by 45 degrees, to receive the reflected signal from optical resonator, to further rotate the reflected signal by another 45 degrees, and to transmit the further-rotated signal towards the second beam splitter.

In another example, the polarization rotator is the quarter waveplate, the quarter waveplate is configured to receive the linearly-polarized light signal that is p-polarized, to convert the linearly-polarized light into circularly-polarized light, to receive the reflected signal from the optical resonator, to convert the reflected signal into linearly-polarized light with a 90 degree rotation as s-polarized light, and to transmit the s-polarized light towards the second beam splitter.

In one example, the controller is configured to monitor at least one signal of the reflected signal, the transmitted signal, and the auxiliary signal, and to provide the control signal based on a characteristic of the monitored at least one signal.

In one example, the controller is configured to monitor the reflected signal and to set the operating point based on a characteristic of the reflected signal.

In one example, the controller is configured to monitor the reflected signal and the auxiliary signal, and to set the operating point based on at least one characteristic of the reflected signal and the auxiliary signal.

In one example, the controller is configured to monitor the reflected signal and the transmitted signal, and to set the operating point based on at least one characteristic of the reflected signal and the transmitted signal.

According to one embodiment, a method of maintaining an operating point of an optical receiver comprises receiving an optical signal at an optical resonator, the optical resonator reflecting a portion of the optical signal to produce a reflected signal, accumulating a resonant optical energy based at least in part on the optical signal, and producing an intensity-modulated transmitted signal, an intensity modulation of the intensity-modulated transmitted signal being representative of a modulation of an input optical signal, detecting a power level of the reflected signal with a first detector, and tuning an operating point of the optical resonator with a controller based on the power level of the reflected signal.

In one example, the method further comprises detecting the intensity-modulated transmitted signal with a second detector to provide a detected transmitted signal, splitting the input optical signal into a first portion directed towards the optical resonator and a second portion directed towards a third detector, and detecting a power level of the second portion of the input optical signal with the third detector to provide an auxiliary signal to the controller. In another example, the method further comprises receiving the optical signal at a first semi-reflective surface of the optical resonator and providing the reflected signal back towards the first beam splitter.

In one example, the modulation of the input optical signal can be any of phase modulation, frequency modulation, intensity modulation, or a combination thereof.

In one example, the method further comprises controlling a steering mechanism of the optical receiver based on the auxiliary signal. In another example, controlling the steering mechanism is based on the auxiliary signal to adjust an angle of the input optical signal such that the second portion of the input optical signal is concentrated in a center of the third detector.

In one example, the method further comprises receiving the first portion of the input optical signal at a second beam splitter to transmit a third portion towards the optical resonator, and rotating a polarization axis of third portion with a polarization rotator to provide a phase rotated signal to the optical resonator, and further phase rotating the reflected signal with the polarization rotator to provide a further phase rotated reflected signal to the second beam splitter, providing with the second beam splitter the further phase rotated reflected signal to the first detector.

In one example, the at least one part of the first portion is a p-polarized signal.

In one example, the method further comprises monitoring, by the controller, at least one signal of the reflected signal, the transmitted signal, and the auxiliary signal, and providing, by the controller, the control signal based on a characteristic of the monitored at least one signal.

In one example, the method further comprises monitoring, by the controller, the reflected signal, and setting, by the controller, the operating point based on a characteristic of the reflected signal. In one example, the operating point is set by changing the optical path of the resonator In one example, the method further comprises monitoring, by the controller, the reflected signal and the auxiliary signal, and setting, by the controller, the operating point based on at least one characteristic of the reflected signal and the auxiliary signal. In one example, the operating point is set by changing the optical path of the resonator In one example, the method further comprises monitoring, by the controller, the reflected signal and the transmitted signal, and setting, by the controller, the operating point based on at least one characteristic of the reflected signal and the transmitted signal. In one example, the operating point is set by changing the optical path of the resonator In one example, the controller modifies the optical path of the optical resonator based on the at least one characteristic. In another example, the at least one characteristic is a power level of one or more of the reflected signal, the transmitted signal, and the auxiliary signal.

In one example, the method further comprises accumulating the resonant optical signal energy inside the optical resonator between the first semi-reflective surface and a second semi-reflective surface positioned facing the first semi-reflective surface to approach a steady-state output value of the transmitted signal, the intensity modulation of the transmitted signal including a series of deviations from the steady-state output value.

In one example, the method further comprises tuning by the controller, the operating point of the optical resonator by applying a voltage to electro-optic material to alter the index of refraction of a material interposed between the first semi-reflective surface and the second semi reflective surface, causing an optical thickness of the optical resonator to change.

In one example, the method further comprises tuning, by the controller, the operating point of the optical resonator by altering a temperature of air interposed between the first semi-reflective surface and the second semi reflective surface, causing an optical thickness of the optical resonator to change.

In one example, the method further comprises maintaining or changing the operating point of the optical resonator by tuning the optical path length of the optical resonator by altering a temperature of a solid silicon material interposed between the first semi-reflective surface and the second semi-reflective surface of the optical resonator. In one example, the method further comprises altering the temperature using one or more Peltier heaters.

In one example, the method further comprises maintaining or changing the operating point of the optical resonator by tuning a piezo-tuned air-spaced optical resonator by applying a voltage to one or more piezo elements, the one or more piezo elements changing in length when the voltage is applied, thereby changing a distance between the first semi-reflective surface and a second semi-reflective surface of the optical resonator.

According to one embodiment, a method of maintaining an operating point of an optical receiver comprises receiving an optical signal, providing the optical signal to an optical resonator, reflecting a portion of an optical signal at an optical resonator to produce a reflected signal, detecting a power level of the reflected signal, and tuning the optical resonator to tune an operating point of the optical resonator based on the power level of the reflected signal.

In one example, the method further comprises splitting the optical signal into a first portion directed towards the optical resonator and a second portion, and detecting a power level of the second portion of optical signal to provide an auxiliary signal.

In one example, the method further comprises detecting a transmitted signal from the optical resonator to provide a transmitted signal. In one example, the method further comprises reflecting the optical signal at a first semi-reflective surface of the optical resonator. In another example, the method further comprises monitoring at least one signal of the reflected signal, the transmitted signal, and the auxiliary signal. In one example, the method further comprises monitoring the reflected signal, and setting the operating point based on a characteristic of the reflected signal. In another example, the method further comprises monitoring the reflected signal and the auxiliary signal, and setting the operating point based on at least one characteristic of the reflected signal and the auxiliary signal. In one example, the method further comprises monitoring the reflected signal and the transmitted signal, and setting the operating point based on at least one characteristic of the reflected signal and the transmitted signal.

In one example, the method further comprises controlling a steering mechanism of the optical receiver based on the auxiliary signal to adjust an angle of the input optical signal.

In one example, the method further comprises accumulating the resonant optical signal energy inside the optical resonator between a first semi-reflective surface of the optical resonator and a second semi-reflective surface of the optical resonator positioned facing the first semi-reflective surface to approach a steady-state output value of a transmitted signal, the intensity modulation of the transmitted signal including a series of deviations from the steady-state output value.

In one example, the method further comprises tuning the operating point of the optical resonator by applying a voltage to electro-optic material to alter the index of refraction of the material interposed between the first semi-reflective surface and the second semi reflective surface, causing an optical thickness of the optical resonator to change.

In one example, the method further comprises tuning the operating point of the optical resonator by altering a temperature of air interposed between the first semi-reflective surface and the second semi reflective surface, causing an optical thickness of the optical resonator to change.

In one example, the method further comprises maintaining or changing the operating point of the optical resonator by tuning the optical path length of the optical resonator by altering a temperature of a solid silicon material interposed between the first semi-reflective surface and the second semi-reflective surface of the optical resonator. In one example, the method further comprises altering the temperature using one or more Peltier heaters.

In one example, the method further comprises maintaining or changing the operating point of the optical resonator by tuning a piezo-tuned air-spaced optical resonator by applying a voltage to one or more piezo elements, the one or more piezo elements changing in length when the voltage is applied, thereby changing a distance between the first semi-reflective surface and a second semi-reflective surface of the optical resonator.

In one example, the method further comprises splitting the first portion of the input optical signal to provide a third portion of the optical signal towards the optical resonator, and rotating a polarization axis of the third portion with a polarization rotator to provide a phase rotated signal to the optical resonator, and further phase rotating the reflected signal with the polarization rotator to provide a further phase rotated reflected signal. In another example, the third portion is a p-polarized signal.

Still other aspects, embodiments, and advantages of these exemplary aspects and examples are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and examples described herein may also include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. For purposes of clarity, not every component may be labeled or shown in every figure. In the figures.

DETAILED DESCRIPTION

Certain optical signal receivers and methods include an optical resonator, such as an etalon or Fabry-Perot resonator or other bulk free-space optical cavity/resonator, that is used to demodulate received optical signals. Using an optical resonator in the demodulator may offer advantages over conventional demodulation techniques, including the ability to demodulate weak optical signals without a locally coherent clock source. The received optical signals may be phase modulated, amplitude modulated, or frequency modulated, or may be modulated using a combination of these techniques (e.g., QAM methods). In certain examples, the optical resonator converts a received phase, amplitude, or frequency modulated optical signal into a directly detectable intensity modulated output signal.

An optical resonator may be sensitive to various parameters within the communications system and environment and its output response signal may change as a function of any of these parameters, including the angle of arrival and wavelength of the incoming optical signal, the modulation format, and the data rate. In controlled environments, such as a research laboratory, it may be possible to precisely tune and maintain the optical wavelength and the data rate, thereby allowing the output optical signal to be optimized for a given optical cavity. However, in practical applications, tuning would require communication across the link between the receiver and the transmitter to provide information to optimize the wavelength for the optical cavity being used in the receiver. This may not be practical or desirable in many applications. Furthermore, regarding the transmission data rate, it is generally desirable to be able to send and receive an optimal signal for different data rates while using the same receiver hardware.

As noted above, the problem of signal optimization can be addressed by changing the carrier frequency and the data rate. An alternative is to tune the cavity of the optical resonator. Cavity tuning is an approach to modify or change the filtering characteristics of an optical cavity. This can be done in any number of ways, including, but not limited to changing the physical cavity length (e.g., by mechanical movement or by the application of pressure), changing the optical density within the cavity (e.g., by using the electro-optic effect or modifying the optical material), or using angle tuning. Delay line lengths can also be applied before or after the optical cavity to adjust for different data rates.

Aspects and embodiments are directed to methods and optical receivers for dynamically optimizing an operating point of an optical receiver for varying conditions (e.g., changing carrier wavelength, modulation format, and/or data rate) without requiring communication between the transmitter and receiver and without requiring a high-performance transmitter. As discussed in more detail below, aspects and embodiments are directed to the tuning of optical receivers that include one or more optical cavity resonators by tuning an operating point of an optical cavity resonator using a reflected signal from an optical cavity resonator. Additional aspects and embodiments are directed to tuning an operating point of the optical cavity resonator using a reflected signal from the optical cavity resonator and a transmitted signal from the optical cavity resonator. Additional aspects and embodiments are directed to tuning an operating point of the optical cavity resonator using a reflected signal from the optical cavity resonator and an auxiliary signal from the optical receiver.

It is to be appreciated that embodiments of the methods and optical receivers discussed herein are not limited in application to the details of construction and the arrangement of components set forth in the following description or illustrated in the accompanying drawings. The methods and optical receivers are capable of implementation in other embodiments and of being practiced or of being carried out in various ways. Examples of specific implementations are provided herein for illustrative purposes only and are not intended to be limiting.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation. The terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms "light," "light signal," and "optical signal" are not meant to imply any particular characteristic of the light, such as frequency or wavelength, band, coherency, spectral density, quality factor, etc., and may include radio waves, microwaves, infrared, visible, and/or ultraviolet electromagnetic radiation, or other non-ionizing electromagnetic radiation conventionally processed in the field of optics.

Figure 1:
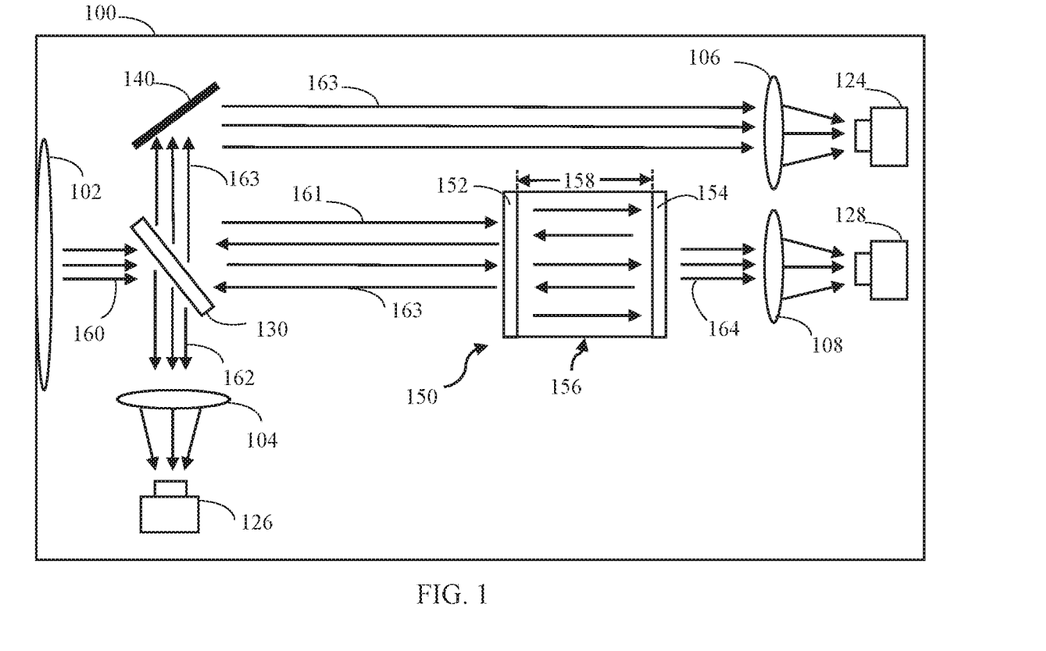
FIG. 1 is a diagram of one example of an optical receiver according to aspects of the present invention.

FIG. 1 illustrates one example of an optical receiver 100 according to various examples described herein. As illustrated, the optical receiver 100 may include a beam splitter 130, an optical resonator 150, and a plurality of detectors.

In other examples, the optical receiver may use one or more detectors, depending on which control signals are required. FIG. 1 shows the optical receiver 100 including a first detector 124, a second detector 128, and a third detector 126. As further illustrated, the optical receiver 100 may include various optical elements (e.g., shown as lenses 104, 106, and 108) for directing and/or focusing light on or towards one or more of the illustrated detectors 124, 126, and 128. While lenses 104, 106, and 108 are shown as being a single lens for illustrative purposes, in various examples, each lens may be a plurality of lenses and/or other optical elements. While detectors 124, 126, and 128 are shown as including a single detector, in various examples, each detector may be representative of a plurality of detectors and/or other detection elements. While only one reflective surface 140 is shown, optical receiver 100 may utilize no reflective surfaces between beam splitter 130 and lens 106 or a plurality of reflective surfaces in order to direct and/or focus light throughout the system. The reflective surface may be a mirror. The optical receiver 100 is further shown in FIG. 1 as including an aperture 102 (e.g., shown as a lens). The aperture 102 is positioned to receive a free-space optical signal and direct the free-space optical signal to the beam splitter 130. While shown as including a single lens 102, in various examples, a plurality of mirrors or lenses may be positioned at the aperture 102 to collect, direct, and/or focus the free-space optical signal toward the beam splitter 130. For instance, an objective lens or objective lens assembly may form the aperture 102. The aperture 102 and the beam splitter 130 may be centered about an optical axis along which the free-space optical signal travels. The free-space optical signal may primarily consist of non-ionizing electromagnetic radiation.

The optical receiver 100 receives a modulated input optical signal 160 transmitted along a free space signal path (e.g., free space optical, FSO), a fiber coupling, or another waveguide system from a transmitter (not shown). The optical receiver 100 includes a demodulator that includes an optical resonator 150. As used herein, the term "optical resonator" refers to a component capable of sensing variations, such as frequency variations, amplitude variations, or phase variations in the received optical signal. Examples of optical resonators may include Fabry-Perot etalons or other types of optical resonators. Each of the detectors 124, 126, 128 may include at least one optical-electrical converter (OEC) and signal processing circuitry. The OEC and the signal processing circuitry may be collectively referred to as a detector. The OEC and the signal processing circuitry may be separate components or may be part of a common module. In some embodiments, some or all of the processing circuitry may be incorporated into one or more controllers. For purposes of brevity, each detector discussed herein may have similar subcomponents. However, each detector may also have different components. The optical resonator 150 is positioned to receive at least a first portion of the modulated optical signal 160 as it passes through beam splitter 130 and to produce an output optical signal (transmitted signal) 164 that has characteristics representative of the modulation of the optical signal 160, as discussed further below.

The input optical signal 160 is split by first beam splitter 130 into a first portion 161 and a second portion 162. The first portion 161 is directed towards a first surface 152 of the optical resonator 150. Since the surface 152 is at least semi-reflective, some or all of the signal 161 is reflected back towards the beam splitter 130. It is appreciated that the beam splitter can have any ration of beam splitting of the signals, such that the first number in the ratio added to the second number in the ratio equals 100. In some embodiments, the beam splitter is an 80/20 beam splitter. In other embodiments, the first beam splitter is a 95/5 beam splitter. In some embodiments, the first beam splitter is a 50/50 beam splitter. In some embodiments, the beam splitter 130 is a plate beam splitter or cube beam splitter. The beam splitter 130 directs the reflected signal 163 towards lens 106 and first detector 124, which receives the signal 163 and produces an electrical signal representing a characteristic of the reflected signal 163. The electrical signal is received and analyzed by a controller to tune an operating pint of the optical resonator 156. In some embodiments, the characteristic is a power level. In other embodiments, the characteristic is an average power level. In some embodiments, a mirror 140 is used to direct the reflected signal 163 towards the first detector 124. In other embodiments, no mirrors are needed to direct the reflected signal 163 towards detector 124. In some embodiments, more than one mirror may be used to direct the reflected signal 163 towards the detector 124.

Third detector 126 receives the second portion of the optical signal 162 and converts the second portion of the optical signal 162 into an electrical signal, which is received and analyzed by a controller to determine a characteristic of the second portion of the optical signal 162. According to some embodiments, the electrical signal is analyzed by a controller and can be used to tune the optical resonator 156. In some embodiments, the characteristic is a power level. In other embodiments, the power level is an average level of power.

According to some embodiments, the detector 126 is coupled to one or more of a controller and a steering mechanism. In some embodiments the detector is a position detector. In some embodiments, the steering mechanism is a Fast Steering Mirror (FSM). The electrical signal detected by the detector 126 is analyzed by the controller and used as an auxiliary signal to control the operating point of the optical resonator 150. In some embodiments, the detector 126 is a quad cell. In other embodiments, the detector 126 is an octo cell. In some embodiments, the auxiliary signal received by the controller is used to manipulate the steering mechanism so that the light impacting the detector 126 is concentrated at a center of the detector 126, thereby maximizing an amount of power of the input optical signal 160 being directed towards the optical resonator 150.

The optical resonator 150 is positioned to receive the signal 161 at a first surface 152. The optical resonator 150 is configured to transform variations in the optical signal 161 into an intensity modulation of transmitted output optical signal energy (also described herein as signal 164). In particular, the optical resonator 150 is configured to accumulate resonant optical signal energy within the optical resonator 150 and convert the variation (e.g., phase, frequency, or amplitude modulation) of the received optical signal 161 to an intensity modulation of the signal 161, in part, by interaction of the optical signal 161 with resonating optical signal energy within the optical resonator 150.

In certain examples an optical resonator 150 is a component having a pair of parallel semi-reflective surfaces 152 and 154 that may include an optically transparent material in between, and has a characteristic resonant frequency associated with a certain wavelength of light based upon a spacing (i.e., dimension 158) between the semi-reflective surfaces. The surfaces 152 and 154 are semi-reflective and also semi-transmissive, in that they allow some light through, and therefore some of a first portion 161 of the received optical signal 161 will be reflected by the optical resonator 150 as reflected optical signal 163 and some of the first portion of the received optical signal is provided to the optical resonator 150 and may resonate or accumulate inside optical resonator (i.e., in the interior 156 between the two semi-reflective surfaces 152 and 154). Additionally, some of the light resonating inside is provided at an output of the optical resonator 150 (through at least one of the semi-transmissive surfaces 154) as a transmitted signal. Light emerging from the optical resonator 150 is shown, for example, as the transmitted optical signal 164.

The optical resonator 150 is configured to convert the modulation of the optical signal 161 into an intensity modulated output optical signal 164. The first portion of the optical signal 161 may be phase modulated, amplitude modulated, and/or frequency modulated.

When a steady-state resonance condition is established within the optical resonator 150, the transmitted output optical signal energy (represented by arrow(s) 164) is emitted from the optical resonator 150 at a steady intensity. When a variation occurs in the arriving optical signal 161, temporarily disrupting the steady-state, the intensity of the transmitted output optical signal energy is disrupted. During successive reflections of the free-space optical signal inside the optical resonator 150, resonance is re-established and the intensity of the transmitted output optical signal energy returns to its steady-state level.

According to some embodiments, the transmitted signal 164 is detected by the second detector 128 to provide a detected electrical signal (transmitted signal) that is received and analyzed by the controller to control the operating point of the optical resonator 150. Detector 128 receives the output optical signal 164 from the optical resonator 150 and the OEC of detector 128 converts the optical signal 164 passing through lens 108 into an electrical signal that can be processed by the signal processing circuitry of detector 128 to produce a decoded information signal. The decoded information signal may include the information that was encoded on the optical signal 160. The OEC of detector 128 may include one or more photo-diodes, for example, or other components capable of transforming an optical signal into an electrical signal. The signal processing circuitry of detector 128 may include various components, as will be understood by those skilled in the art, such as analog-to-digital converters, filters, amplifiers, controllers, etc., to condition and process the electrical signals received from the detector 128 to produce the decoded information signal. The optical receiver 100 may further include a controller that may be coupled to the optical resonator 150 and configured to adjust parameters of the optical resonator 150 to maintain a particular operating point of the optical resonator.

The optical resonator 150 may be an etalon which may have one or more characteristic resonant frequencies, each associated with a certain wavelength of light, based upon the spacing (i.e., dimensional length) between the semi-reflective surfaces 152 and 154. In some examples, the etalon may include reflective surfaces (including semi-reflective surfaces) that are not co-planar and/or are not co-linear. For example, an interior reflective surface of the etalon may include some curvature, and an opposing surface may also be curved such that a distance between the two surfaces is substantially constant across various regions of the optical resonator, in some examples. In other examples, the etalon may have non-linear or non-planar surfaces with varying distances between the surfaces at various regions, and may still function as an optical resonator for various wavelengths and at various regions, suitable for use in examples discussed herein. Accordingly, the optical resonator 150 of various examples may be purposefully designed to conform to a surface, or to have various regions responsive to differing wavelengths, or responsive to differing angles of arrival for a given wavelength, in certain examples.

The use of the term "etalon" throughout this disclosure is not intended to be limiting and as used herein may include any of multiple structures, including plates with reflecting surfaces as well as parallel mirrors with various materials positioned in-between, and in particular examples, with controllable optical materials positioned in-between. The spacing between the semi-reflective surfaces of an etalon may be referred to herein as a cavity, but is not so limited. That is the resonant cavities may include other structures, such interferometers and the like. Additionally, etalon structures may be formed as a laminate, layer, film, coating, or the like.

Figure 2:
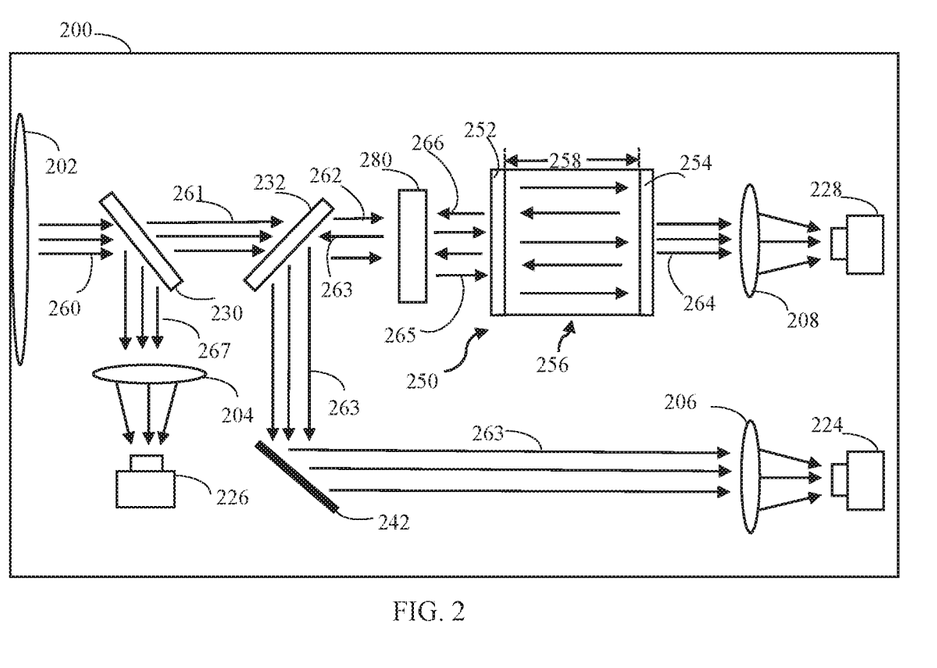
FIG. 2 is a diagram of another example of an optical receiver according to aspects of the present invention.

FIG. 2 illustrates one example of an optical receiver 200 according to various aspects and embodiments described herein. The optical receiver 200 includes an aperture 202 (e.g., shown as a lens), lens 204, lens 206, lens 208, first detector 224, third detector 226, second detector 228, first beam splitter 230, second beam splitter 232, reflective surface 242, polarization rotator 280, and optical resonator 250 including first and second surfaces 252 and 254 spaced apart by dimension 258. While lenses 202, 204, 206, and 208 are shown as including a single lens, in various examples, each lens may be representative of a plurality of lenses and/or other optical elements. While detectors 224, 226, and 228 are shown as including a single detector, in various examples, each detector may be representative of a plurality of detectors and/or other detection elements. While only one reflective surface 242 is shown in FIG. 2, optical receiver 202 may utilizes no reflective surfaces between beam splitter 232 and lens 206 or a plurality of reflective surfaces in order to direct light throughout the system. The reflective surface may be a mirror. While shown as including a single lens 202, in various examples, a plurality of mirrors or lenses may be positioned at the aperture 202 to collect, direct, and/or focus the free-space optical signal at the beam splitter 230. The optical receiver 200 may have one or more components or functions that are similar to optical receiver 100. For purposes of brevity, the differing components and/or functions of optical receiver 200 will be described below, while similar components or functions are appropriately described above.

The primary differences between the optical receiver 200 of FIG. 2 and the optical receiver 100 of FIG. 1 include the second beam splitter 232 and the polarization rotator 280. In some embodiments, the second beam splitter 232 is a polarizing beam splitter (PBS). In other embodiments, the second beam splitter 232 is polarizing plate or a polarizing cube beam splitter. In some embodiments, the polarization rotator 280 is a Faraday rotator. In other embodiments, the polarization rotator 280 is a quarter-wave plate.

As understood to those of skill in the art, the input optical signal 260 may have one or more linear polarizations. In some instances, the one or more polarizations may be unknown when received at the optical receiver 200. For instance, a first polarization of the free-space optical signal may be a vertical polarization, and a second polarization of the free-space optical signal may be a horizontal polarization. Accordingly, a first polarization of the free-space optical signal may be orthogonal to a second polarization of the free-space optical signal. In other examples, the optical signal 160 may have a single polarization. It is appreciated that the vertical and horizontal polarizations are merely described herein as examples and are not intended to be limiting. That is, in other examples, the vertical and horizontal polarizations may be switched, and may include other orthogonal polarizations.

Operation of the receiver of FIG. 2 will now be described focusing on the differences between the receiver of FIG. 1 and FIG. 2. As illustrated in FIG. 2, the first beam splitter splits the received optical signal 260 into a first portion 261 and a second portion 267. The first portion 261 of the received optical signal is provide to the second beam splitter 232. The second portion 267 of the received signal is provided to the third detector 226 to provide an auxiliary signal such as described with respect to the receiver of FIG. 1 The second beam splitter 232 receives the first portion 261 of the received signal and splits the signal into a third portion of the received signal having a first polarization signal 262 and a second polarization signal. The second beam splitter 232 is configured to transmit the third portion of the received signal 262 having a first polarization along a first optical path towards the polarization rotator 280 and to reflect light in signal 261 having a second polarization away from beam splitter 232 in a direction opposite to the direction of travel of signal 263 as signal 263 leaves beam splitter 232.

The incoming optical signal 260 or the signal 261 may contain a mixture of p-polarized light and s-polarized light. In one example, the first polarization signal 262 is p-polarized light and the second polarization signal is s-polarized light. The third portion of the received signal 262 is a p-polarized signal 262 passes through the polarization beam splitter unattenuated, reaching surface 252 of optical resonator 256 as a p-polarized signal 265.

Polarization rotator 280 is interposed between the second beam splitter 232 and the optical resonator 250 along an optical path. The polarization rotator 280 is configured to rotate the polarization of the third portion of the third portion of the received signal 262.

In one example, the polarization rotator 280 is a Faraday rotator. The Faraday rotator rotates the signal 262 by a predetermined angle, such as 45 degrees. As illustrated in FIG. 2, the polarization rotator 280 rotates a polarization of the signal 262 and directs the signal 262 as first polarization rotated signal 265 towards the first surface 252 of optical resonator 250. The at least semi-reflective nature of surface 252 causes some or all of the first polarization rotated signal 265 to be reflected back towards the polarization rotator 280 as signal 266. In this example, signal 262 and signal 266 may both be linearly-polarized light. As the signal 266 passes back through polarization rotator 280, it is further polarization rotated by the same amount as it was first rotated to provide second polarization rotated signal 263. For example, if signal 265 is signal 262 rotated by 45 degrees, then signal 266 is further rotated to provide signal 263 rotated by 90 degrees. The further rotated signal 263 is directed or reflected by beam splitter 232 towards detector 224.

In one example, signal 262 may be linearly-polarized light. The linearly-polarized light may be p-polarized light. The polarization rotator 280 converts the signal 262 from being linearly-polarized to circularly-polarized. As signal 262 is reflected from the optical resonator 256, the polarization rotator 280 receives the reflected circularly-polarized light and converts it into linearly-polarized light 263 with a 90 degree rotation. In this example, the signal 263 may be s-polarized.

In some examples, a mirror, such as mirror 242 is utilized to direct the optical signal 263 towards detector 224. In some examples, beam splitter 232 is a polarizing beam splitter. It is appreciated that one of benefits of the receiver of FIG. 2 having a polarizing beam splitter 232 with a polarization rotator 280 is that more of the signal 263 is captured at lens 206 and subsequently provided to detector 224. Otherwise the receiver of FIG. 2 operates the same as the receiver of FIG. 1.

Figure 3:
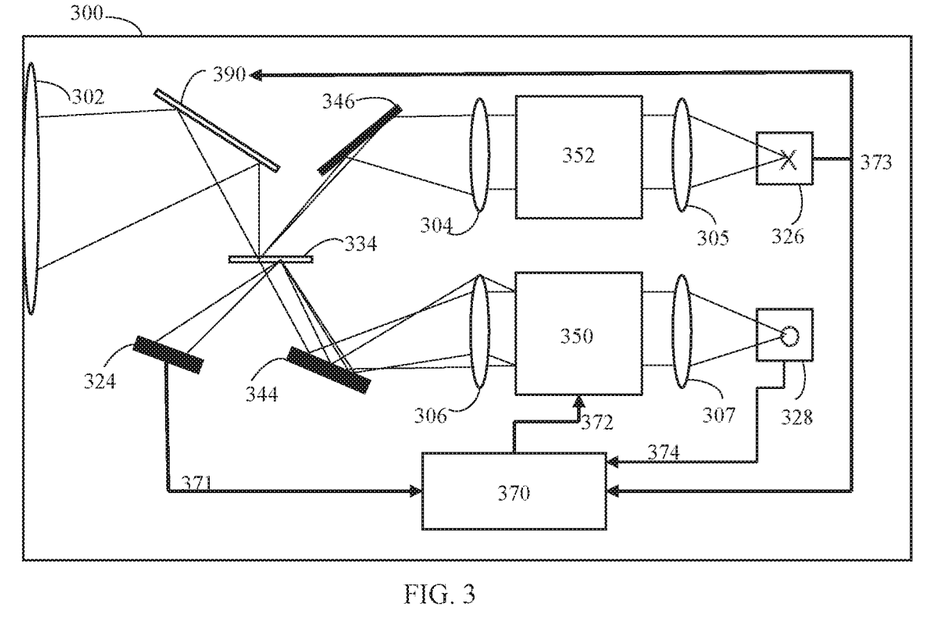
FIG. 3 is a diagram showing an example of an opto-mechanics schematic of an optical receiver.

FIG. 3 illustrates an example of an opto-mechanics schematic diagram for use with any optical receivers disclosed herein. The schematic includes: an optical receiver 300. The optical receiver 300 includes an aperture 302 (e.g., shown as a lens), which may be similar to apertures 102 or 202. The optical receiver may include, for example, lens 304, lens 305, lens 306, lens 307, first detector 324, multi-mode (MM) fiber and second detector 328, third detector 326, beam splitter 334, reflective surfaces 346 and 344, optical resonator 350, matched solid glass 352, controller 370, first detected signal 371, control signal 372, third detected signal 373, second detected signal 374, and steering mirror 390. Each of the reflective surfaces 346 and 344 may be a mirror.

The received optical signal such as signal 160 or 260 (of the receivers of FIG. 1 and FIG. 2), enters through aperture 302, is reflected off steering mirror 390 towards beam splitter 334. Beam splitter 334 may be, for example, beam splitter 130 or beam splitter 232 (of the receivers of FIG. 1 and FIG. 2). Detector 326 may be, for example, detector 126 (of the receiver of FIG. 1) that receives signal 162 or detector 226 (of the receiver of FIG. 2) that receives signal 262. Lens 306, optical resonator 350, and lens 307 may be the optical resonator 150 and lens 108 of the receiver of FIG. 1 or the lens 265, optical resonator 250 and lens 208 of the optical receiver of FIG. 2. Lens 304, matched solid glass 352, and lens 305 provide a same length optical path to that through the lens 306, optical resonator 350, and lens 307 and correspond to the reflected signal path for signal 163 of the receiver of FIG. 1 and the reflected signal path for the reflected signal 263 of the receiver of FIG. 2. In one example, matched solid glass 352 may have a same thickness as optical resonator 350. In another example, optical resonator 350 is an air spaced etalon and matched slid glass 352 has a same thickness as the air spaced etalon 350 to create symmetric paths to ensure good coupling alignment. The MM fiber and detector 328 may, for example, transmit optical signal 164 (of the receiver of FIG. 1) or 264 (of the receiver of FIG. 2) towards a detector, such as detector 128 (of the receiver of FIG. 1) or detector 228 (of the receiver of FIG. 2). Detector 324 may be, for example, detector 124 (of the receiver of FIG. 1) that receives reflected signal 163 or detector 224 that receives reflected signal 263 (of the receiver of FIG. 2).

An operating point of the optical resonator 350 of the optical receiver 300 may be tuned according to one or more control signals received by controller 370 of optical receiver 300.

A first example of tuning an operating point of the optical resonator 350 comprises tuning the optical resonator based on, a reflected signal from the optical resonator 350, such as reflected signal 163 (of the receiver of FIG. 1) or reflected signal 263 (of the receiver of FIG. 2), which is provided to detector 324 of FIG. 3, producing first detected signal 371, which corresponds to a characteristic of the signal reflected by the optical resonator 350. For example, controller 370 receives detected signal 371 to determine an amount of power of the reflected signal 371 received by detector 324 in order to adjust a resonance condition or operating point of the optical resonator 350 via the control signal 372. By doing so, the controller 370 can dynamically adjust transmission characteristics and an intensity response of the optical resonator 350 in response to signal modulation changes in an incoming optical signal. The optical receiver 350 can be dynamically tuned to optimize signal-to-noise ratio or other parameters for different modulation formats of an incoming optical signal or other different operating conditions.

A second example of tuning an operating point of the optical resonator 350 comprises tuning the optical resonator based on the detected reflected signal 371 received by controller 370 as described in the first example, and additionally based on detected auxiliary signal 373, which can be detected from signal 162 (of the receiver of FIG. 1) or signal 267 (of the receiver of FIG. 2) provided at detector 326. Detector 326 provides detected auxiliary signal 373 to the controller 370. Controller 370 utilizes signal 373 to determine an amount of power in the auxiliary signal received by detector 326. Controller 370 utilizes the information from signal 371 and signal 373 in order to adjust a resonance condition or operating point of the optical resonator 350 via the control signal 372.

A third example of tuning an operating point of the optical resonator 350 comprises tuning the optical resonator based on the detected reflected signal 371 received by controller 370, as well the detected transmitted optical signal 328, which can be the transmitted signal 164 (of the receiver of FIG. 1) or the detected transmitted signal 264 (of the receiver of FIG. 2). The detected signal 328 is provided to the MM fiber and the signal is further transmitted via MM fiber 328 to a detector, such as detector 224 or detector 324. The detector produces the detected transmitted signal 374 which to the controller 370. Controller 370 processes signal 374 to determine an amount of power in the transmitted signal received by the detector. Controller 370 utilizes the information from signals 371 and 374 in order to adjust a resonance condition or operating point of the optical resonator 350 via the control signal 372.

Thus, in some embodiments such as the first example, only the detected reflected signal 371 is used to tune the optical resonator to an operating point selected by controller 370. In such embodiments, neither the detected transmitted signal 374 or the detected auxiliary signal 373 is utilized to tune the optical resonator.

In other embodiments, such as the second example, both the detected reflected signal 371 and the detected auxiliary signal 373 are used to tune the optical resonator to an operating point selected by controller 370. In such embodiments, the transmitted signal 374 is not utilized to tune the optical resonator.

In some embodiments, such as the third example, both the detected reflected signal 371 and the detected transmitted signal 374 are used by controller 370 to tune the optical resonator to an operating point selected by controller 370. In such embodiments, the detected auxiliary signal 373 is not utilized to tune the optical resonator.

In another embodiment, each of detected signals 371, 373, and 374 is used by controller 370 to tune the optical resonator 350 via control signal 372.

In some embodiments, the detected auxiliary signal 373 is additionally used to direct steering mechanism 390 to focus light on the first detector and/or on beam splitter 334.

Figure 4:
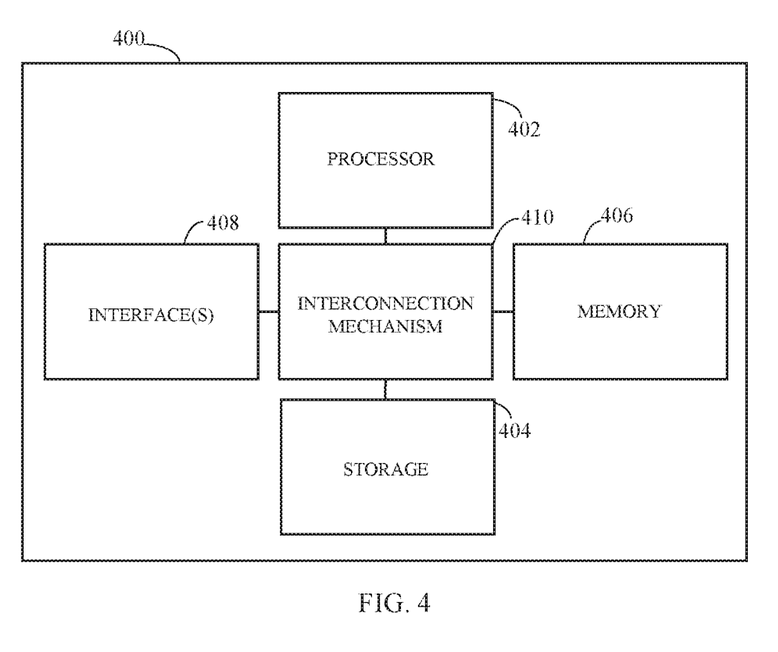
FIG. 4 is a functional block diagram of one example of a processing system that may be used in an optical receiver according to aspects of the present invention.

FIG. 4 illustrates one example of a processing system 400 that may be included within the optical receiver 100 illustrated in FIG. 1, the optical receiver 200 illustrated in FIG. 2, the optical receiver 300 illustrated in FIG. 3, or any other suitable optical receiver. The processing system 400 may include a processor 402, data storage 404, a memory 406, and one or more interfaces 408, such as a system interface and/or a user interface. While not explicitly illustrated in FIG. 4, in certain examples the processing system 400 may be coupled to a power source. The power source may deliver power to one or more components of the processing system 400, as well as other components of the optical receiver 100.

In FIG. 4, the processor 402 is coupled to the data storage 404, memory 406, and the various interfaces 408. The memory 406 stores programs (e.g., sequences of instructions coded to be executable by the processor 402) and data during operation of the processing system 400. Thus, the memory 406 may be a relatively high performance, volatile, random access memory such as a dynamic random access memory ("DRAM") or static memory ("SRAM"). However, the memory 406 may include any device for storing data, such as a disk drive or other nonvolatile storage device. Various examples may organize the memory 406 into particularized and, in some cases, unique structures to perform the functions disclosed herein. These data structures may be sized and organized to store values for particular data and types of data.

The data storage 404 includes a computer readable and writeable data storage medium configured to store non-transitory instructions and other data, and can include non-volatile storage medium, such as optical or magnetic disk, ROM or flash memory. The instructions may include executable programs or other code that can be executed by the at least one processor 402 to perform any of the functions described herein.

In various examples, the processing system 400 includes several interface components 408, such as a system interface and/or a user interface. Each of the interface components 408 is configured to exchange, e.g., send or receive, data with other components of the processing system 400 (and/or associated optical receiver), or other devices in communication with the processing system 400. According to various examples, the interface components 408 may include hardware components, software components, or a combination of hardware and software components. In certain examples, components of the system interface couples the processor 402 to one or more components of the optical receiver 100 shown in FIG. 1, one or more other components of the optical receiver 200 shown in FIG. 2, or one or more other components of the optical receiver 300 shown in FIG. 3. The system interface may provide one or more control signals to any such components and may manage the operation of such components, as described above. In some examples, processor 402 corresponds to a controller of one or more of the optical receivers 100, 200, and 300.

A user interface may include hardware and/or software components that allow a corresponding optical receiver in which the processing system 400 is incorporated to communicate with an external entity, such as a user. These components may be configured to receive information from user interactions with the user interface. Examples of the components that may be employed within the user interface include buttons, switches, light-emitting diodes, touch screens, displays, stored audio signals, voice recognition, or an application on a computer-enabled device in communication with the processing system 400. Data received at the various interfaces may be provided to the processor 402, as illustrated in FIG. 4. Communication coupling (e.g., shown interconnection mechanism 410) between the processor 402, memory 406, data storage 404, and interface(s) 408 may be implemented as one or more physical busses in conformance with standard, proprietary, or specialized computing bus technologies.

The processor 402 performs a series of routines (e.g., digital signal processing instructions) that result in manipulated data that is stored in and retrieved from the data storage 404, as discussed above. In various examples, the series of instructions result in interpretation of the outputs from an optical resonator, as discussed above. Such instructions may correspond to commands for interpreting peaks and troughs of such output signals to determine phase, amplitude, and/or frequency changes, and recovering information therefrom.

The processor 402 may be any type of processor, multi-processor or controller. For instance, the processor may include a processor manufactured by INTEL, AMD, MOTOROLA, or FREESCALE. In some examples, the processor 402 may be configured to execute an operating system, such as a real-time operating system (RTOS), for instance RTLinux, or a non-real time operating system, such as BSD or GNU/Linux. The operating system may provide platform services to application software. These platform services may include inter-process and network communication, file system management and standard database manipulation. One or more of many operating systems may be used, and examples are not limited to any particular operating system or operating system characteristic.

Portions of the disclosure herein make reference to orders of magnitude of distance, e.g., length, and time, e.g., duration, of aspects of light signals, with regard to the length or duration of a segment of light or a wavelength of light. It is to be understood that distance and duration may at times be used interchangeably with respect to light and optical systems, and unless the context implies otherwise, the relationship between distance and duration with respect to light is the speed of light in the medium of propagation. For example, phase relationships are on the order of one wavelength of light, and a wavelength is directly inversely proportional to frequency by the speed of light in the propagation medium. Similarly, segments of light generated by modulation of a light source are on the order of the segment length, which is directly inversely proportional to modulation rate by the speed of light in the propagation medium.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Examples of specific implementations are provided herein for illustrative purposes only and are not intended to be limiting. Accordingly, the foregoing description and drawings are by way of example only, and the scope of the invention should be determined from proper construction of the appended claims, and their equivalents.

What is claimed is:

1. An optical receiver comprising:
    an optical resonator that is configured to receive an optical signal, that reflects a portion of the optical signal to produce a reflected signal, that is configured to accumulate a resonant optical energy based at least in part on the optical signal, and that is configured to produce an intensity-modulated transmitted signal, an intensity modulation of the intensity-modulated transmitted signal being representative of a modulation of an input optical signal;
    a first detector coupled to the optical resonator that is configured to detect the reflected signal and to provide a detected signal representative of a power level of the reflected signal; and
    a controller coupled to the optical resonator and to the first detector, the controller configured to provide a control signal to the optical resonator to tune an operating point of the optical resonator based on the power level of the reflected signal.

2. The optical receiver of claim 1, wherein the optical receiver further comprises:
    a second detector coupled to the optical resonator that is configured to detect the transmitted signal and provide a detected transmitted signal; and
    a first beam splitter that is configured to split the input optical signal into a first portion directed towards the optical resonator and a second portion directed towards a third detector, and wherein the first beam splitter is further configured to provide the reflected signal to the first detector,
    wherein the controller is also coupled to the second detector and to the third detector, and
    wherein the third detector is configured to detect a power level of the second portion of the input optical signal to provide an auxiliary signal to the controller.

3. The optical receiver of claim 2, wherein the optical receiver further comprises a steering mechanism coupled to the third detector, the third detector is a position sensitive detector, the steering mechanism is a Fast Steering Mirror (FSM), and the controller is configured to control the fast steering mechanism based on the auxiliary signal to adjust an angle of the input optical signal such that the second portion of the input optical signal is concentrated in a center of the third detector.

4. The optical receiver of claim 2, wherein the optical resonator further comprises:
    a first semi-reflective surface positioned to receive the optical signal and to provide the reflected signal back towards the first beam splitter; and
    a second semi-reflective surface positioned facing the first semi-reflective surface,
    wherein the optical resonator is configured to accumulate the resonant optical signal energy inside the optical resonator between the first semi-reflective surface and the second semi-reflective surface to approach a steady-state output value of the transmitted signal, the intensity modulation of the transmitted signal including a series of deviations from the steady-state output value.

5. The optical receiver of claim 4, wherein the optical resonator further comprises a material interposed between the first semi-reflective surface and the second semi reflective surface, and the material is a solid material.

6. The optical receiver of claim 5, wherein the solid material is silicon, and the optical thickness of the optical resonator is changed by altering the temperature of the solid silicon.

7. The optical receiver of claim 4, the optical resonator further comprises a material interposed between the first semi-reflective surface and the second semi reflective surface, wherein the material is air, a distance between the semi-reflective surfaces is changed to maintain or change the operating point of the optical resonator, and one or both of the semi-reflective surfaces is moved by one or more piezo elements that change in length when a voltage is applied.

8. The optical receiver of claim 2, wherein the optical receiver further comprises:
    a second beam splitter that is a polarization beam splitter that is configured to receive the first portion of the input optical signal, and that is configured to transmit a third portion towards the optical resonator; and
    a polarization rotator configured to rotate a polarization axis of the third portion and provide a phase rotated signal to the optical resonator, and that further phase rotates the reflected signal to provide a further phase rotated reflected signal to the second beam splitter,
    wherein the second beam splitter provides the further phase rotated reflected signal to the first detector.

9. The optical receiver of claim 2, wherein the controller is configured to monitor at least one signal of the reflected signal, the transmitted signal, and the auxiliary signal, and to provide the control signal based on a characteristic of the monitored at least one signal.

10. The optical receiver of claim 2, wherein the controller is configured to monitor the reflected signal and to set the operating point based on a characteristic of the reflected signal.

11. The optical receiver of claim 2, wherein the controller is configured to monitor the reflected signal and the auxiliary signal, and to set the operating point based on at least one characteristic of the reflected signal and the auxiliary signal.

12. The optical receiver of claim 2, wherein the controller is configured to monitor the reflected signal and the transmitted signal, and to set the operating point based on at least one characteristic of the reflected signal and the transmitted signal.

13. A method of maintaining an operating point of an optical resonator of an optical receiver, the method comprising:

receiving an optical signal at the optical resonator, the optical resonator reflecting a portion of the optical signal to produce a reflected signal, accumulating a resonant optical energy based at least in part on the optical signal, and producing an intensity-modulated transmitted signal, an intensity modulation of the intensity-modulated transmitted signal being representative of a modulation of an input optical signal;

detecting a power level of the reflected signal with a first detector; and tuning an operating point of the optical resonator with a controller based on the power level of the reflected signal.

14. The method of claim 13, further comprising:

detecting the intensity-modulated transmitted signal with a second detector to provide a detected transmitted signal;

splitting the input optical signal into a first portion directed towards the optical resonator and a second portion directed towards a third detector; and detecting a power level of the second portion of the input optical signal with the third detector to provide an auxiliary signal to the controller.

15. The method of claim 14, further comprising controlling a steering mechanism based on the auxiliary signal to adjust an angle of the input optical signal such that the second portion of the input optical signal is concentrated in a center of the third detector.

16. The method of claim 14, further comprising:

receiving the first portion of the input optical signal at a second beam splitter to transmit a third portion towards the optical resonator;

rotating a polarization axis of third portion with a polarization rotator to provide a phase rotated signal to the optical resonator, and further phase rotating the reflected signal with the polarization rotator to provide a further phase rotated reflected signal to the second beam splitter; and providing with the second beam splitter the further phase rotated reflected signal to the first detector.

17. The method of claim 14, further comprising:

monitoring, by the controller, at least one signal of the reflected signal, the transmitted signal, and the auxiliary signal; and providing, by the controller, the control signal based on a characteristic of the monitored at least one signal.

18. The method of claim 14, further comprising:

monitoring, by the controller, the reflected signal; and setting, by the controller, the operating point based on a characteristic of the reflected signal.

19. The method of claim 14, further comprising:

monitoring, by the controller, the reflected signal and the auxiliary signal; and setting, by the controller, the operating point based on at least one characteristic of the reflected signal and the auxiliary signal.

20. The method of claim 14, further comprising:

monitoring, by the controller, the reflected signal and the transmitted signal; and setting, by the controller, the operating point based on at least one characteristic of the reflected signal and the transmitted signal.

21. The method of claim 13, further comprising tuning the optical resonator by maintaining or changing the operating point of the optical resonator by altering a temperature of a solid silicon material interposed between a first semi-reflective surface and a second semi-reflective surface of the optical resonator.

22. The method of claim 13, further comprising tuning the optical resonator by maintaining or changing the operating point of the optical resonator by applying a voltage to one or more piezo elements, the one or more piezo elements changing in length when the voltage is applied, thereby changing a distance between a first semi-reflective surface and a second semi-reflective surface of the optical resonator.

* * * * *